United States Patent
Fischer et al.

(10) Patent No.: US 9,425,588 B2
(45) Date of Patent: Aug. 23, 2016

(54) ELECTRICAL ENCLOSURE AND GUARD ASSEMBLY THEREFOR

(71) Applicant: EATON CORPORATION, Cleveland, OH (US)

(72) Inventors: Kenneth Martin Fischer, Finleyville, PA (US); Ronald William Brand, Jr., Beaver Falls, PA (US); James Jeffery Benke, Pittsburgh, PA (US); Kimberley Morris, Moon Township, PA (US)

(73) Assignee: EATON CORPORATION, Cleveland, OH (US)

( * ) Notice: Subject to any disclaimer, the term of this patent is extended or adjusted under 35 U.S.C. 154(b) by 215 days.

(21) Appl. No.: 14/305,306

(22) Filed: Jun. 16, 2014

(65) Prior Publication Data

US 2015/0364277 A1 Dec. 17, 2015

(51) Int. Cl.
*H01H 3/20* (2006.01)
*H02B 1/26* (2006.01)
*H01H 9/22* (2006.01)

(52) U.S. Cl.
CPC ... *H02B 1/26* (2013.01); *H01H 9/22* (2013.01)

(58) Field of Classification Search
CPC ............. H01H 13/12; H01H 9/22; H02B 1/26
USPC ............................. 200/329–331, 50.03–50.06
See application file for complete search history.

(56) References Cited

U.S. PATENT DOCUMENTS

| 6,797,903 | B1 | 9/2004 | Winslett et al. |
| 6,974,922 | B2 | 12/2005 | Bortolloni et al. |
| 7,238,903 | B2 | 7/2007 | Fischer |
| 2007/0175745 | A1* | 8/2007 | Houck, III ............... H01H 3/50 200/331 |
| 2009/0107819 | A1* | 4/2009 | Samudrikam ............ H01H 3/10 200/336 |

* cited by examiner

*Primary Examiner* — Renee Luebke
*Assistant Examiner* — Lheiren Mae A Caroc
(74) *Attorney, Agent, or Firm* — Eckert Seamans Cherin & Mellott, LLC; John P. Power; Grant E. Coffield

(57) ABSTRACT

A guard assembly is for an electrical enclosure. The electrical enclosure includes a housing, an electrical switching apparatus, and a handle. The guard assembly includes: a shaft including a first end and a second end, the first end being structured to be coupled to the handle, the second end being structured to be coupled to the electrical switching apparatus; and a sleeve assembly structured to move between a retracted position and an extended position, the sleeve assembly including a sleeve member, the sleeve member including: a base located proximate the first end of the shaft, and a cover portion extending from the base toward the second end of the shaft, the shaft extending at least partially through the cover portion. Responsive to the sleeve assembly moving from the retracted position toward the extended position, the sleeve member moves away from the second end of the shaft.

20 Claims, 5 Drawing Sheets

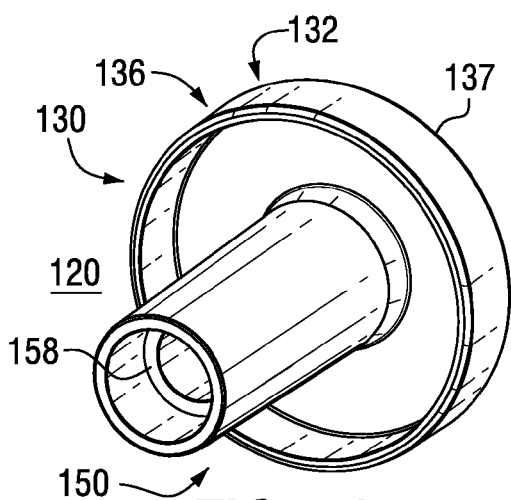 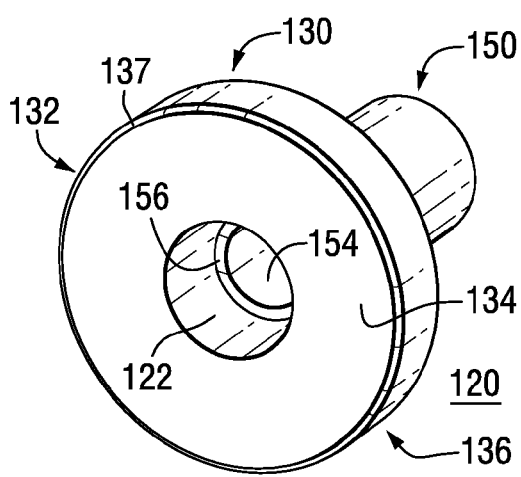
FIG. 2A        FIG. 2B
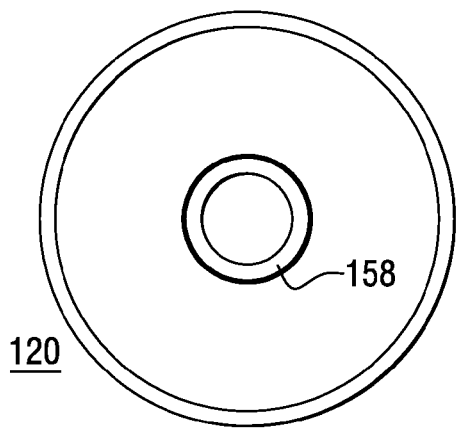 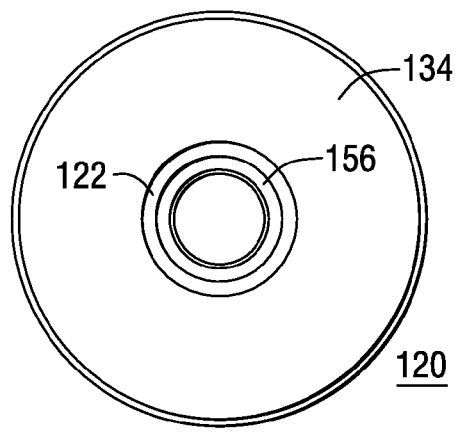
FIG. 2C        FIG. 2D
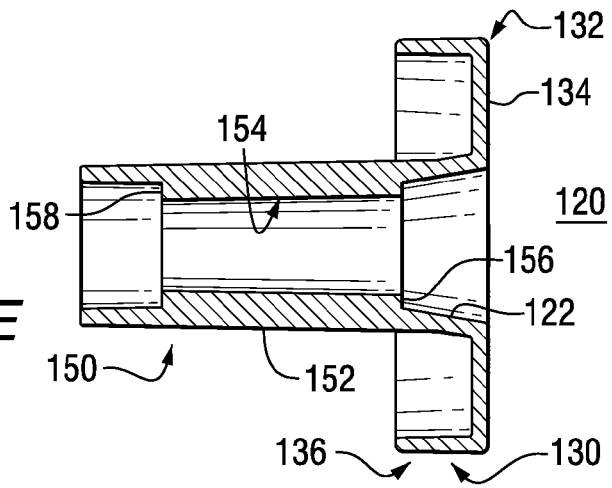
FIG. 2E

ELECTRICAL ENCLOSURE AND GUARD ASSEMBLY THEREFOR

BACKGROUND

1. Field

The disclosed concept pertains generally to electrical enclosures such as for example, electrical enclosures for housing circuit breakers. The disclosed concept also pertains to guard assemblies for electrical enclosures.

2. Background Information

Electrical apparatus, such as electrical switching apparatus or electrical meters used in power distribution systems, are often mounted on or within an electrical enclosure (e.g., without limitation, a panelboard; a load center; a meter breaker panel) either individually or in combination with other electrical meters or switchgear (e.g., without limitation, circuit switching devices and circuit interrupters such as circuit breakers, contactors, motor starters, motor controllers and other load controllers). Such circuit interrupters are used to protect electrical circuitry from damage due to a trip condition, such as, for example, an overcurrent condition, an overload condition, an undervoltage condition, a relatively high level short circuit or fault condition, a ground fault or arc fault condition.

One known type of enclosure, for example, includes a handle at the exterior of the enclosure that is mechanically connected with a mechanism of the circuit interrupter within the enclosure that is movable to switch the circuit interrupter between, for example, its ON and OFF positions. In one such exemplary configuration, a metal shaft is attached to the circuit interrupter within the cabinet at one end and extends toward and is coupled to a handle of the enclosure at the other end. The shaft enables the handle on the outside of the cabinet to be rotated (by way of example) to cause the circuit interrupter to be switched between its ON and OFF conditions. However, among other disadvantages of such designs, the shaft can cause harm to an operator during maintenance and installation.

There is thus room for improvement in electrical enclosures and in guard assemblies therefor.

SUMMARY

These needs and others are met by embodiments of the disclosed concept wherein a guard assembly is provided which among other benefits, shields dangerous components of an electrical enclosure.

In accordance with one aspect of the disclosed concept, a guard assembly for an electrical enclosure is provided. The electrical enclosure includes a housing, an electrical switching apparatus disposed in the housing, and a handle coupled to the housing. The guard assembly comprises: a shaft comprising a first end and a second end, the first end being structured to be coupled to the handle, the second end being structured to be coupled to the electrical switching apparatus; and a sleeve assembly structured to move between a retracted position and an extended position, the sleeve assembly comprising a sleeve member, the sleeve member comprising: a base disposed proximate the first end of the shaft, and a cover portion extending from the base toward the second end of the shaft, the shaft extending at least partially through the cover portion. Responsive to the sleeve assembly moving from the retracted position toward the extended position, the sleeve member moves away from the second end of the shaft.

As another aspect of the disclosed concept, an electrical enclosure is provided. The electrical enclosure comprises: a housing; an electrical switching apparatus disposed in the housing; a handle coupled to the housing; and a guard assembly comprising: a shaft comprising a first end and a second end, the first end being structured to be coupled to the handle, the second end being structured to be coupled to the electrical switching apparatus, and a sleeve assembly structured to move between a retracted position and an extended position, the sleeve assembly comprising a sleeve member, the sleeve member comprising: a base disposed proximate the first end of the shaft, and a cover portion extending from the base toward the second end of the shaft, the shaft extending at least partially through the cover portion. Responsive to the sleeve assembly moving from the retracted position toward the extended position, the sleeve member moves away from the second end of the shaft.

BRIEF DESCRIPTION OF THE DRAWINGS

A full understanding of the disclosed concept can be gained from the following description of the preferred embodiments when read in conjunction with the accompanying drawings in which:

FIGS. 2A through 2E are different views of a sleeve member for the guard assembly of FIG. 1;

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

Figure 1:
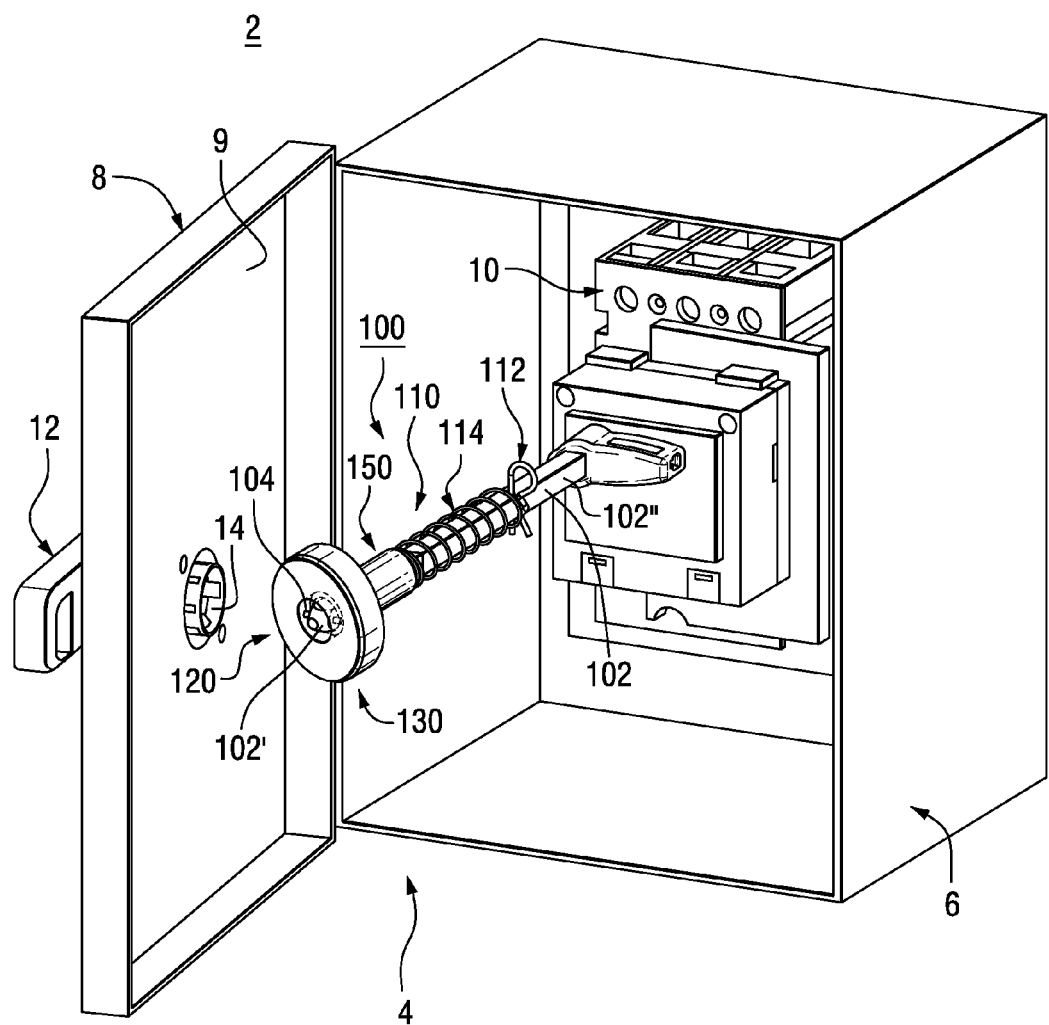
FIG. 1 is an isometric view of an electrical enclosure and guard assembly therefor, in accordance with an exemplary embodiment of the disclosed concept.

FIG. 1 shows an electrical enclosure 2 in accordance with a non-limiting embodiment of the disclosed concept. As seen, the example electrical enclosure 2 includes a housing 4 that has a containment portion 6 and a door 8 coupled to the containment portion 6. The door 8 is structured to move between an open position (shown) and a closed position. Additionally, located within the containment portion 6 of the housing 4 is an electrical switching apparatus (e.g., without limitation, circuit breaker 10). Furthermore, coupled to the door 8 of the housing 4 is a handle 12 that is structured to be cooperable with the circuit breaker 10. In operation, responsive to the handle 12 being actuated (e.g., without limitation, rotated between ON and OFF positions), the circuit breaker 10 moves between corresponding ON and OFF positions.

The electrical enclosure 2 further includes a guard assembly 100 located within the housing 4. The guard assembly 100 has a shaft 102 and a sleeve assembly 110 located on the shaft 102. As seen, the shaft 102 extends through the sleeve assembly 110. Furthermore, the shaft 102 includes a first end 102' structured to be coupled to an internal portion 14 of the handle 12, and a second end 102" coupled to the circuit breaker 10. The sleeve assembly 110 has a blocking element (e.g., without limitation, pin 112), a biasing member (e.g., without limitation, spring 114), and a sleeve member 120. The shaft 102 further includes a pin member 104 located near the first end 102'. The pin member 104 has relatively sharp edges. Additionally, to mark the door 8 during assembly so that the handle 12 can be properly aligned, the first end 102' of the shaft 102 is relatively sharp. These features present safety concerns for operators handling such components. As will be discussed in greater detail below, the guard assembly 100 advantageously protects operators during assembly and/or maintenance of the electrical enclosure 2.

FIGS. 2A through 2E show different views of the sleeve member 120. Referring to FIGS. 2A and 2B, the sleeve member 120 includes a base 130 and a cover portion 150 extending from the base 130 toward the second end 102" (FIG. 1) of the shaft 102 (FIG. 1). The base 130 of the sleeve member 120 includes a disc-shaped portion 132 having an engaging surface 134 (FIGS. 2B, 2D and 2E) that is structured to engage the internal portion 14 (FIG. 1) of the handle 12 (FIG. 1).

The sleeve member 120 may be made of any suitable material and/or by any suitable process known in the art, preferably being an injection molded piece. The base 130 further includes an annular rim 136 extending from the disc-shaped portion 132 toward the second end 102" (FIG. 1) of the shaft 102 (FIG. 1). As seen, the annular rim 136 is substantially normal to the disc-shaped portion 132. Additionally, referring to FIGS. 2A and 2B, the disc-shaped portion 132 has a perimeter 137 and the annular rim 136 generally extends from the perimeter 137 toward the second end 102" (FIG. 1) of the shaft 102 (FIG. 1). Because the sleeve member 120 is preferably an injection molded piece, having the annular rim 136, and also having the annular rim 136 extend from the perimeter 137 of the disc-shaped portion 132, advantageously prevents the sleeve member 120 from becoming warped during molding. In other words, the annular rim 136 provides the sleeve member 120 with additional stability while being molded.

Referring to FIG. 2E, the cover portion 150 of the sleeve member 120 includes a gripping portion 152 and an annular protrusion 154 extending from the gripping portion 152 toward the shaft 102 (FIG. 1). Furthermore, the annular protrusion 154 is elongated and has a pair of opposing planar end surfaces 156,158. The planar end surface 156 advantageously provides a smooth surface for the pin member 104 (FIG. 1) to rest on. The planar end surface 158 advantageously provides a smooth surface for the spring 114 (FIG. 1) to rest on.

Figure 3A:
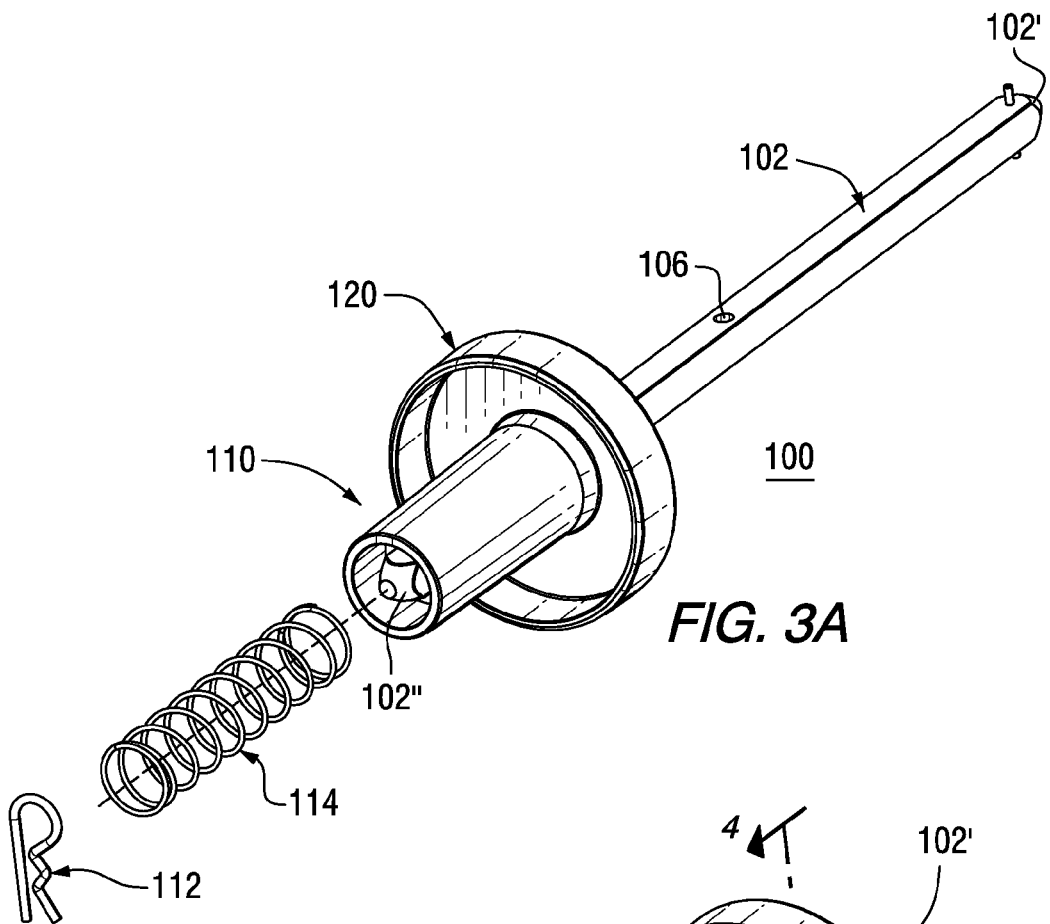
FIGS. 3A and 3B are exploded and assembled isometric views, respectively, of the guard assembly of FIG. 1.
Figure 3B:
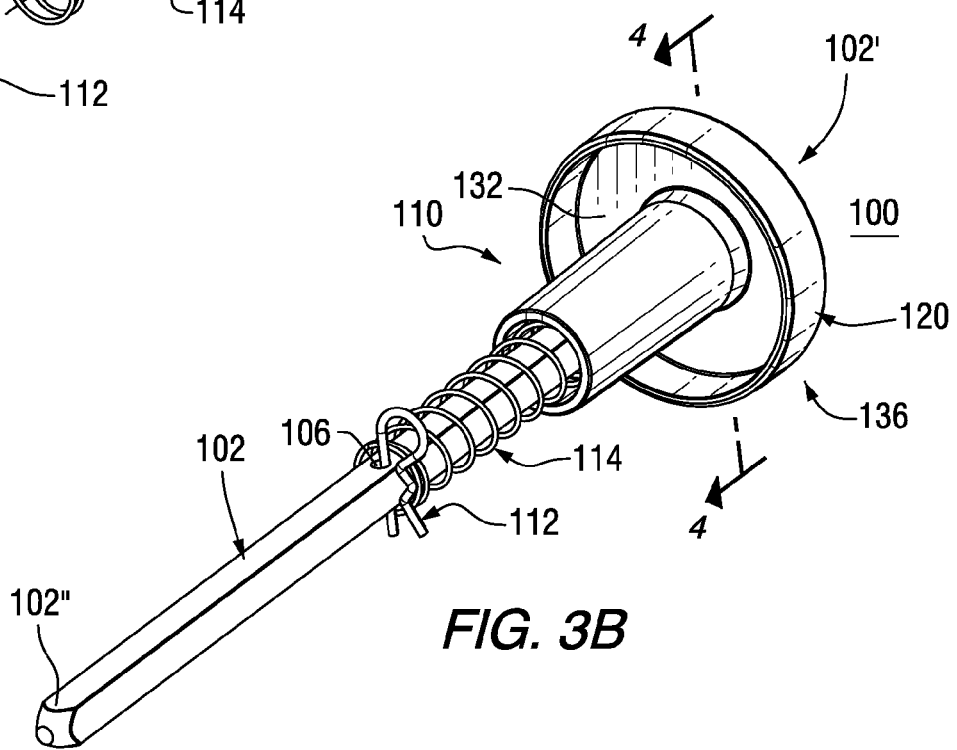

FIGS. 3A and 3B respectively show exploded and assembled views of the guard assembly 100. As seen, the pin 112 is located on the shaft 102 between the first end 102' and the second end 102", and the spring 114 is located between the pin 112 and the first end 102' of the shaft 102. Furthermore, the shaft 102 has a through hole 106 and the pin 112 is structured to extend through the through hole 106. While the pin 112 fixes the location of the spring 114 at one end, it will be appreciated that the electrical enclosure 2 and guard assembly 100 therefor could employ any known or suitable alternative blocking member (not shown) and/or assembly (not shown) to perform the desired function of fixing the spring 114 at one end.

Figure 4:
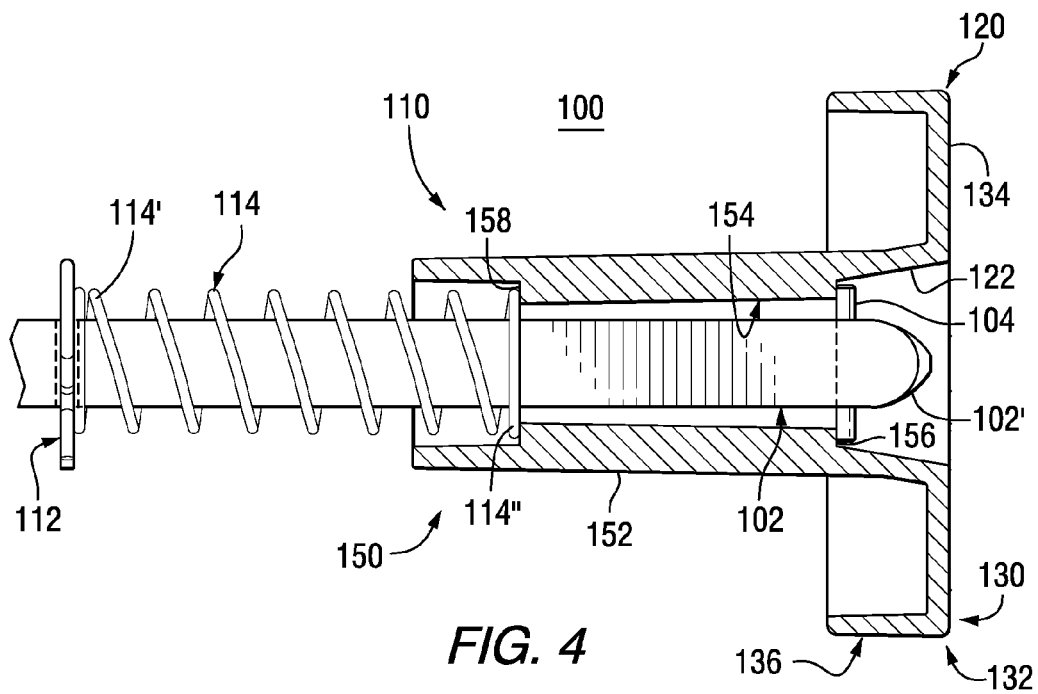
FIG. 4 is a section view of the guard assembly, taken along line 4-4 of FIG. 3B, shown with the sleeve assembly in an extended position.
Figure 5:
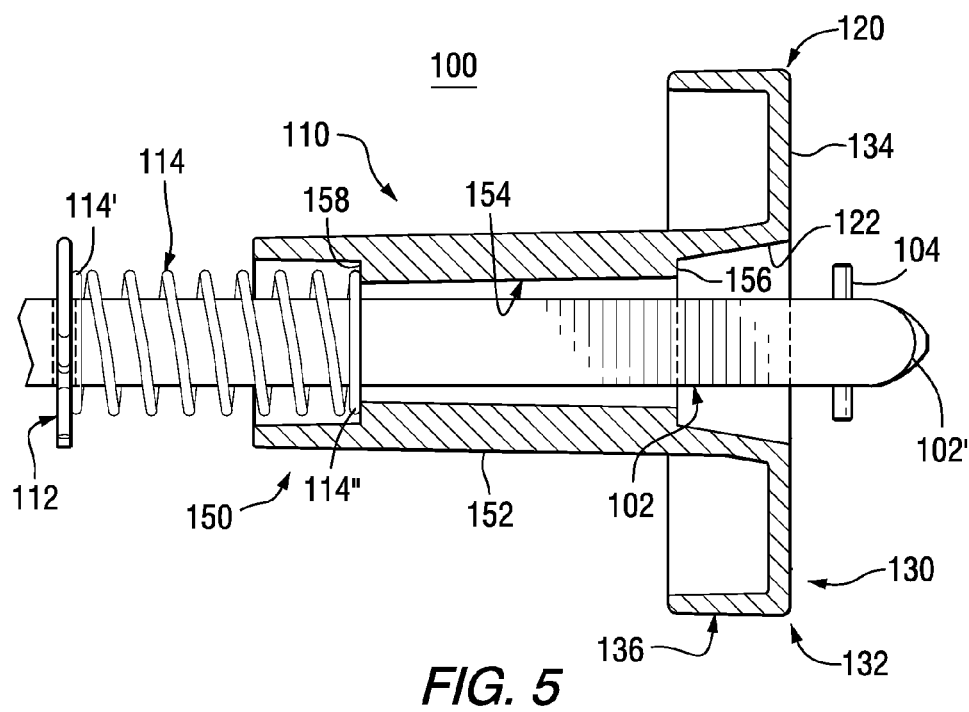
FIG. 5 is a section view of the guard assembly of FIG. 4, modified to show the sleeve assembly in a retracted position.

FIGS. 4 and 5 show section views of the guard assembly 100. FIG. 4 shows the guard assembly 100 with the sleeve assembly 110 in an extended position. In this position, the door 8 (FIG. 1) of the electrical enclosure 2 is in the open position. FIG. 5 shows the guard assembly 100 with the sleeve assembly 110 in a retracted position. In this position, the door 8 (FIG. 1) of the electrical enclosure 2 is in the closed position. As seen, responsive to the sleeve assembly 110 moving from the retracted position (FIG. 5) toward the extended position (FIG. 4), the sleeve member 120 moves away from the second end 102" (FIG. 1) of the shaft 102. It follows that responsive to the door 8 (FIG. 1) moving from the closed position toward the open position, the sleeve assembly moves from the retracted position (FIG. 5) toward the extended position (FIG. 4).

When the door 8 (FIG. 1) is in the open position, or when the interior of the electrical enclosure 2 is able to be accessed, such as during assembly and/or maintenance, the relatively sharp first end 102' of the shaft 102 and the pin member 104 are substantially located within the sleeve member 120. In other words, in the extended position (FIG. 4), the first end 102' (i.e., the portion of the shaft 102 extending from the distal most point of the shaft 102 to proximate the pin member 104) of the shaft 102 and the pin member 104 are internal with respect to the engaging surface 134 of the sleeve member 120. Thus, an operator assembling the electrical enclosure 2 and/or performing maintenance on the electrical enclosure 2 is advantageously well protected by the sleeve member 120, which surrounds the relatively sharp first end 102' of the shaft 102 and the pin member 104. While the disclosed concept has been described in association with the sleeve member 120 having the base 130 and the corresponding cover portion 150, it will be appreciated that a sleeve member (not shown) may have any known or suitable alternative shape, design and/or configuration to perform the desired function of surrounding the first end 102' and the pin member 104 when the door 8 is in the open position.

Additionally, in the retracted position (FIG. 5), the first end 102' of the shaft 102 is structured to be coupled to the internal portion 14 (FIG. 1) of the handle 12 (FIG. 1). Thus, responsive to the sleeve assembly 110 moving toward the extended position (FIG. 4), the first end 102' of the shaft 102 and the pin member 104 advantageously move and become located between the planar end surface 156 and the engaging surface 134 of the sleeve member 120. In this manner, responsive to the door 8 (FIG. 1) moving from the closed position toward the open position, the sleeve member 120 advantageously surrounds the first end 102' of the shaft 102 and the pin member 104 and thus protects an operator. Furthermore, assembly and operation of the electrical enclosure 2 are significantly unaffected by the guard assembly 100, as the internal portion 14 (FIG. 1) of the handle 12 (FIG. 1) simply pushes the base 130 of the sleeve member 120 toward the second end 102" (FIG. 1) of the shaft 102.

Continuing to refer to FIGS. 4 and 5, the sleeve member 120 further includes an annular chamfered surface 122 extending from the engaging surface 134 to the planar end surface 156 of the annular protrusion 154. As seen, the planar end surface 156 has an outer diameter that is larger than the length of the pin member 104. In operation, and as seen in FIG. 4, the shaft 102 extends through the planar end surface 156. Furthermore, in the extended position (FIG. 4), the pin member 104 engages the planar end surface 156. Thus, because the annular chamfered surface 122 extends radially outward from the planar end surface 156, the annular chamfered surface 122 advantageously enables the pin member 104 to avoid getting stuck while moving between the extended position (FIG. 4) and the retracted position (FIG. 5). In other words, once the pin member 104 releases or becomes spaced from the planar end surface 156, the pin member 104 advantageously does not touch any portion of the sleeve member 120 and is able to mate with the internal portion 14 (FIG. 1) of the handle (12) without disturbance from the sleeve member 120.

Furthermore, in the extended position (FIG. 4) the shaft 102 extends partially through the cover portion 150, and in the retracted position (FIG. 5) the shaft 102 extends entirely through the cover portion 150. Additionally, the spring 114 includes a first end 114' located proximate the pin 112 and a second end 114" that extends into the cover portion 150 and engages the planar end surface 158. Thus, the planar end surface 158 advantageously provides a relatively smooth surface for the second end 114" of the spring 114 to rest on and perform the desired function of biasing the sleeve member 120. In this manner, responsive to the sleeve assembly 110 moving from the retracted position (FIG. 5) toward the extended position (FIG. 4), the second end 114" of the spring 114 pushes the planar end surface 158 away from the second end 102" (FIGS. 1, 3A, 3B, 4 and 5) of the shaft 102 (FIGS. 1, 3A, 3B, 4 and 5). Of course, it will be appreciated that any known or suitable alternative component (not shown) and/or assembly (not shown) may be employed to perform the desired function of retaining the sleeve member 120 in the extended position when the door 8 (FIG. 1) is open, and enabling the sleeve member 120 to move between positions in response to the door 8 (FIG. 1) moving between positions.

Figure 6:
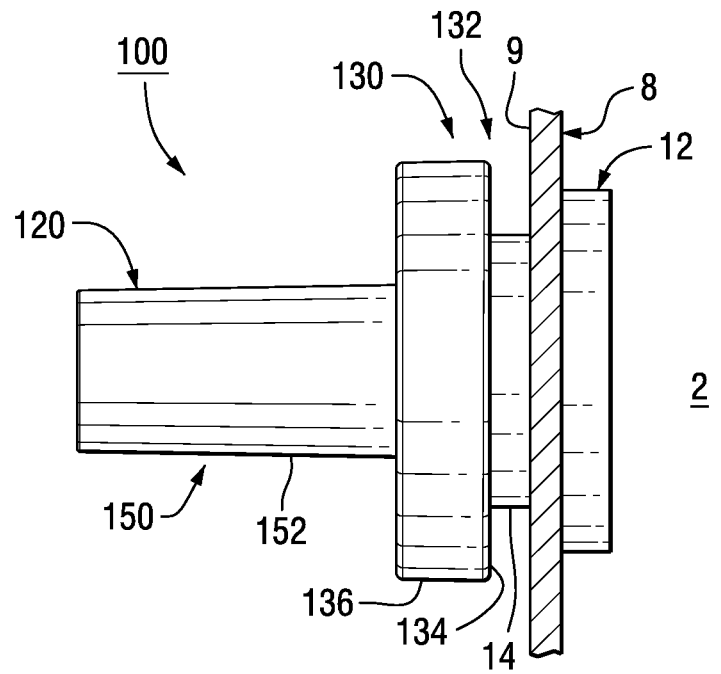
FIG. 6 is a side view of a portion of the electrical enclosure and guard assembly therefor of FIG. 1, shown with the door in a closed position and portions of the electrical enclosure removed to show hidden structures.

FIG. 6 shows a portion of the electrical enclosure 2 with the door 8 in the closed position (i.e., when the guard assembly 100 is in the retracted position (FIG. 5)). Responsive to the door 8 moving from the open position toward the closed position, the internal portion 14 of the handle 12 pushes the base 130 toward the second end 102" of the shaft 102. As seen, in the closed position, the door 8 includes an internal surface 9 that faces the circuit breaker 10 (FIG. 1) and is generally parallel with the disc-shaped portion 132. It follows that when the door 8 is in the closed position, the annular rim 136 is substantially normal to the internal surface 9, and the cover portion 150 and the protrusion 154 (FIGS. 2E, 4 and 5) are elongated in a direction generally normal to the internal surface 9. Because the shaft 102 (FIGS. 1, 3A, 3B, 4 and 5) extends through the sleeve member 120, such positioning desirably allows the internal portion 14 of the handle 12 to push the base 130 in a manner wherein the shaft 102 is not disturbed along a transverse direction. In other words, as the internal portion 14 (FIG. 1) of the handle 12 (FIG. 1) causes the sleeve member 120 to move, the sleeve member 120 only moves longitudinally along the length of the shaft 102.

Figure 7:
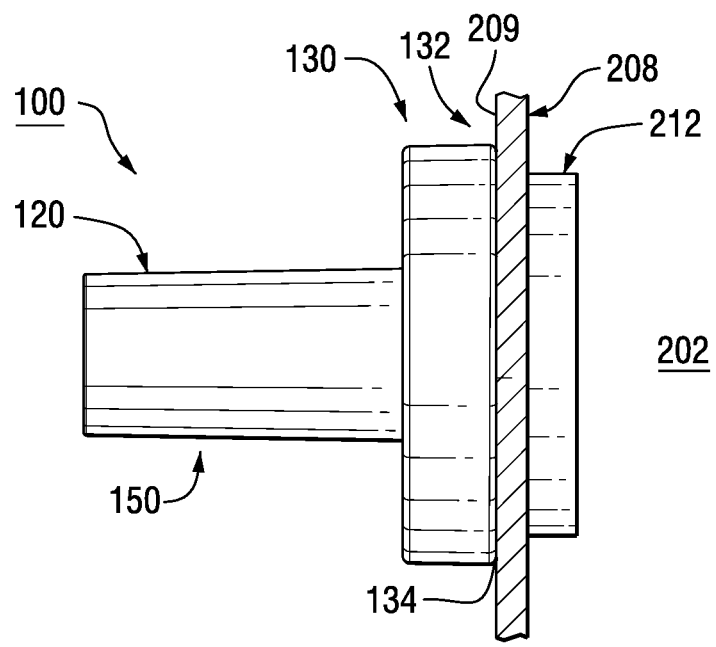
FIG. 7 is a side view of a portion of an electrical enclosure and guard assembly therefor, shown with the door in a closed position and portions of the electrical enclosure removed to show hidden structures, in accordance with an alternative embodiment of the disclosed concept.

FIG. 7 shows a portion of another electrical enclosure 202 in a closed position, in accordance with an alternative non-limiting embodiment of the disclosed concept. As seen, the example electrical enclosure 202 is shown as employed with the guard assembly 100. Furthermore, the electrical enclosure 202 includes a door 208 and a handle 212 coupled to the door 208. The door 208 includes an internal surface 209 and when the door 208 is in the closed position, the internal surface 209 is substantially flush with the engaging surface 134 of the sleeve member 120. Thus, responsive to the door 208 moving from an open position toward the closed position, the internal surface 209 of the door 208 pushes the base 130 of the sleeve member 120 toward the second end 102" of the shaft 102.

Accordingly, it will be appreciated that the disclosed concept provides for an improved (e.g., without limitation, safer, easier to handle) electrical enclosure 2,202 and guard assembly 100 therefor, which among other benefits, provides protection against relatively sharp edges of internal components (e.g., without limitation, first end 102' and pin member 104).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A guard assembly for an electrical enclosure comprising a housing, an electrical switching apparatus disposed in said housing, and a handle coupled to said housing, said guard assembly comprising:
    a shaft comprising a first end and a second end, the first end being structured to be coupled to said handle, the second end being structured to be coupled to said electrical switching apparatus; and
    sleeve assembly structured to move between a retracted position and an extended position, said sleeve assembly comprising a sleeve member, said sleeve member comprising:
        a base disposed proximate the first end of said shaft, and
        a cover portion extending from said base toward the second end of said shaft, said shaft extending at least partially through said cover portion,
    wherein, responsive to said sleeve assembly moving from said retracted position toward said extended position, said sleeve member moves away from the second end of said shaft;
    wherein said sleeve assembly further comprises a biasing member engaging said sleeve member;
    wherein said sleeve assembly further comprises a blocking element disposed on said shaft between the first end of said shaft and the second end of said shaft;
    wherein said biasing member is disposed between said blocking element and the first end of said shaft;
    wherein said shaft has a through hole; and wherein said blocking element is a pin extending through said through hole.

2. The guard assembly of claim 1 wherein said cover portion comprises a gripping portion and a protrusion extending from said gripping portion toward said shaft; wherein said biasing member is a spring; wherein said spring partially extends into said cover portion and comprises a first end and a second end; wherein the first end of said spring is disposed proximate said pin; wherein the second end of said spring engages said protrusion; and wherein, responsive to said sleeve assembly moving from said retracted position toward said extended position, said spring pushes said sleeve member away from the second end of said shaft.

3. A guard assembly for an electrical enclosure comprising a housing, an electrical switching apparatus disposed in said housing, and a handle coupled to said housing, said guard assembly comprising:
    a shaft comprising a first end and a second end, the first end being structured to be coupled to said handle, the second end being structured to be coupled to said electrical switching apparatus; and a sleeve assembly structured to move between a retracted position and an extended position, said sleeve assembly comprising a sleeve member, said sleeve member comprising:
  a base disposed proximate the first end of said shaft, and
  a cover portion extending from said base toward the second end of said shaft, said shaft extending at least partially through said cover portion,
wherein, responsive to said sleeve assembly moving from said retracted position toward said extended position, said sleeve member moves away from the second end of said shaft;
wherein said cover portion comprises a gripping portion and a protrusion extending from said gripping portion toward said shaft;
wherein said protrusion is annular and comprises a planar end surface; and
wherein said shaft is structured to extend through said planar end surface.

4. The guard assembly of claim 3 wherein said base comprises an engaging surface structured to engage said handle; and wherein said sleeve member further comprises an annular chamfered surface extending from said engaging surface to said protrusion.

5. The guard assembly of claim 3 wherein said shaft further comprises a pin member disposed proximate the first end; wherein when said sleeve assembly is in said extended position, said pin member engages said planar end surface; and wherein, when said sleeve assembly is in said extended position, said pin member is disposed between said engaging surface and said planar end surface.

6. A guard assembly for an electrical enclosure comprising a housing, an electrical switching apparatus disposed in said housing, and a handle coupled to said housing, said guard assembly comprising:
  a shaft comprising a first end and a second end, the first end being structured to be coupled to said handle, the second end being structured to be coupled to said electrical switching apparatus; and
  a sleeve assembly structured to move between a retracted position and an extended position, said sleeve assembly comprising a sleeve member, said sleeve member comprising:
    a base disposed proximate the first end of said shaft, and
    a cover portion extending from said base toward the second end of said shaft, said shaft extending at least partially through said cover portion;
  wherein, responsive to said sleeve assembly moving from said retracted position toward said extended position, said sleeve member moves away from the second end of said shaft; wherein said base comprises a disc-shaped portion and an annular rim; and wherein said annular rim extends away from said disc-shaped portion toward the second end of said shaft.

7. The guard assembly of claim 6 wherein said annular rim is substantially normal to said disc-shaped portion.

8. The guard assembly of claim 7 wherein said disc-shaped portion has a perimeter; and wherein said annular rim generally extends from said perimeter toward the second end of said shaft.

9. An electrical enclosure comprising:
  a housing;
  an electrical switching apparatus disposed in said housing;
  a handle coupled to said housing; and
  a guard assembly comprising:
    a shaft comprising a first end and a second end, the first end being structured to be coupled to said handle, the second end being structured to be coupled to said electrical switching apparatus, and
    a sleeve assembly structured to move between a retracted position and an extended position, said sleeve assembly comprising a sleeve member, said sleeve member comprising:
      a base disposed proximate the first end of said shaft, and
      a cover portion extending from said base toward the second end of said shaft, said shaft extending at least partially through said cover portion,
    wherein, responsive to said sleeve assembly moving from said retracted position toward said extended position, said sleeve member moves away from the second end of said shaft;
    wherein said base comprises a disc-shared portion and an annular rim; and
    wherein said annular rim extends away from said disc-shaped portion toward the second end of said shaft.

10. The electrical enclosure of claim 9 wherein said housing comprises a door; wherein said handle is coupled to said door; wherein said door is structured to move between a closed position and an open position; and wherein, responsive to said door moving from said closed position toward said open position, said sleeve assembly moves from said retracted position toward said extended position.

11. The electrical enclosure of claim 10 wherein, responsive to said door moving from said open position toward said closed position, said handle pushes said base of said sleeve member toward the second end of said shaft.

12. The electrical enclosure of claim 10 wherein, responsive to said door moving from said open position toward said closed position, said door pushes said base of said sleeve member toward the second end of said shaft.

13. The electrical enclosure of claim 10 wherein said door comprises an internal surface structured to face said electrical switching apparatus; and wherein when said door is in said closed position, said internal surface is parallel with said disc-shaped portion.

14. The electrical enclosure of claim 13 wherein when said door is in said closed position, said annular rim is substantially normal to said internal surface.

15. The electrical enclosure of claim 13 wherein said disc-shaped portion comprises an engaging surface; and wherein when said door is in said closed position, said engaging surface is substantially flush with said internal surface of said door.

16. The electrical enclosure of claim 13 wherein when said door is in said closed position, said cover portion is elongated in a direction normal to said internal surface.

17. The electrical enclosure of claim 13 wherein said cover portion comprises a gripping portion and an annular protrusion extending from said gripping portion toward said shaft; and wherein when said door is in said closed position, said annular protrusion is elongated in a direction normal to said internal surface.

18. The electrical enclosure of claim 9 wherein said sleeve assembly further comprises a biasing member engaging said sleeve member, and a blocking element disposed on said shaft between the first end of said shaft and the second end of said shaft; wherein said biasing member is disposed between said blocking element and the first end of said shaft; wherein said shaft has a through hole; and wherein said blocking element is a pin extending through said through hole.

19. The electrical enclosure of claim 9 wherein said cover portion comprises a gripping portion and a protrusion extending from said gripping portion toward said shaft; wherein said base further comprises an engaging surface structured to engage said handle; and wherein said sleeve member further comprises an annular chamfered surface extending from said engaging surface to said protrusion.

20. The electrical enclosure of claim 9 wherein said cover portion comprises a gripping portion and a protrusion extending from said gripping portion toward said shaft; wherein said protrusion is annular and comprises a planar end surface; and wherein said shaft is structured to extend through said planar end surface.

* * * * *